(12) United States Patent
Kakui et al.

(10) Patent No.: US 7,525,725 B2
(45) Date of Patent: Apr. 28, 2009

(54) OPTICAL AMPLIFICATION MODULE, OPTICAL AMPLIFIER, OPTICAL COMMUNICATION SYSTEM, AND WHITE LIGHT SOURCE

(75) Inventors: Motoki Kakui, Yokohama (JP); Jun Kinugasa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 38 days.

(21) Appl. No.: 10/378,669

(22) Filed: Mar. 5, 2003

(65) Prior Publication Data

US 2003/0210844 A1     Nov. 13, 2003

Related U.S. Application Data

(60) Provisional application No. 60/364,112, filed on Mar. 15, 2002.

(30) Foreign Application Priority Data

Mar. 5, 2002     (JP)     .............................. 2002-059085

(51) Int. Cl.
 *H04B 10/17*     (2006.01)
 *H04B 10/12*     (2006.01)
(52) U.S. Cl. .................................. 359/337.2; 359/337
(58) Field of Classification Search ................ 359/337, 359/341.31, 337.1, 2, 337.2, 341.3, 341.5
See application file for complete search history.

(56) References Cited

U.S. PATENT DOCUMENTS

| | | | |
|---|---|---|---|
| 5,317,660 A * | 5/1994 | Veith ........................... 385/24 |
| 5,406,411 A * | 4/1995 | Button et al. .......... 359/341.33 |
| 5,457,568 A | 10/1995 | Jacobovitz-Veselka et al. |
| 5,638,204 A * | 6/1997 | Grasso et al. ............ 359/341.3 |
| 5,706,124 A * | 1/1998 | Imoto et al. ............... 359/337.1 |
| 6,147,795 A * | 11/2000 | Derbyshire et al. ......... 359/337 |

(Continued)

FOREIGN PATENT DOCUMENTS

EP     1 032 096 A     8/2000

(Continued)

OTHER PUBLICATIONS

P. C. Becker et al., Erbium-Doped Fiber Amplifiers: Fundamentals and Technology, Academic, San Diego (1999), p. 171.*

(Continued)

*Primary Examiner*—Eric Bolda
(74) *Attorney, Agent, or Firm*—McDermott Will & Emery LLP

(57) ABSTRACT

The present invention relates to an optical amplifier and the like having a flatter gain spectrum in the wavelength band of 1490 nm to 1520 nm than before. The optical amplifier according to the present invention comprises an Er-doped optical waveguide and a Tm-doped optical waveguide having gain spectra difference from each other in the wavelength band. The signal light entered through the input end is first amplified by the Er-doped optical waveguide, and thereafter is amplified by the Tm-doped optical waveguide. The gain deviation of the amplified signal light, which has been amplified in the Er- and Tm-doped optical waveguides and outputted through the output end, can be reduced over the wavelength band.

8 Claims, 14 Drawing Sheets

U.S. PATENT DOCUMENTS

| | | | |
|---|---|---|---|
| 6,313,941 B1* | 11/2001 | Suzuki et al. | 359/337 |
| 6,452,717 B1* | 9/2002 | Endo | 359/337 |
| 6,525,873 B2* | 2/2003 | Gerrish et al. | 359/341.4 |
| 6,529,316 B1* | 3/2003 | Treyz et al. | 359/337.11 |
| 6,535,329 B1* | 3/2003 | Pelard et al. | 359/337 |
| 6,621,623 B1* | 9/2003 | Okuno | 359/341.1 |
| 6,633,429 B2* | 10/2003 | Kinoshita et al. | 359/337.1 |
| 6,694,080 B2* | 2/2004 | Dejneka et al. | 385/123 |
| 6,724,972 B2* | 4/2004 | Anderson et al. | 385/142 |
| 6,909,538 B2* | 6/2005 | Arbore et al. | 359/341.1 |
| 2001/0017728 A1 | 8/2001 | Kitabayashi et al. | |

FOREIGN PATENT DOCUMENTS

| | | |
|---|---|---|
| EP | 1 111 743 A2 | 6/2001 |
| JP | 2001-313433 | 11/2001 |
| JP | 2001-358387 | 12/2001 |
| JP | 2003-046174 | 2/2003 |
| WO | WO 01/01529 A1 | 1/2001 |

OTHER PUBLICATIONS

Ishikawa et al., "Novel 1500 nm-band EDFA with discrete Raman amplifier", ECOC-2001, Post Deadline Paper.*

T. Kamatsu et al., "Laser-diode-pumped highly-efficient gain-shifted thulium-doped fiber amplifier operating in the 1480-1510-nm band", OFC2001, Technical Digest, TuQ4 (2001).

Etsuko Ishikawa et al., "Novel 1500 nm-band EDFA with discrete Raman amplifier", ECOC2001, Postdeadline papers, pp. 48-49, (2001).

Masato Nishihara et al., "Temperature dependence of S-band amplification utilizing EDFA", IEEE, Lasers and Electro-Optics Society, Jul. 14-17, 2002, OWB4-1-OWB4-3.

H. Ono et al., S-band erbium-doped silica fibre amplifier with flattened-gain of over 21dB, Electronics Letters Sep. 12, 2002, vol. 38, No. 19.

Kakui, Motoki., et al. "Long-Wavelength-Band Optical Amplifiers Employing Silica-Based Erbium Doped Fibers Designed for Wavelength Division Multiplexing Systems and Networks." IEICE Trans Electron, vol. E83-C, No. 6, Jun. 2000, pp. 799-815.

European Search Report for Corresponding EP Patent Application No. EP 03 25 1324, Mar. 15, 2006.

Segi T et al. "Silica-based composite fiber amplifier with 1480-1560nm seamless gain-band", Optical Communication, 2001. ecoc '01. 27th European Conference on Sep. 30-Oct. 4, 2001, Piscataway, NJ, USA, IEEE, vol. 2, Sep. 30, 2001, pp. 228-229, XP010582643 ISBN: 0-7803-6705-7.

Nakazato K et al: "Hybrid EDFA Characterization for WDM Transmission with Various Span Loss" Electronics and Communications in Japan, Part I-Communications, Scripta Technica. New York, US, vol. 80, No. 10, Oct. 1997, pp. 58-66, XP000724516 ISSN:8756-6621.

Yamada M et al: "Gain-Flattened Tellurite-Based EDFA with a Flat Amplification Bandwidth of 76 nm" IEEE Photonics Technology Letters, IEEE Inc. New York, US, vol. 10, No. 9, Sep. 1998, pp. 1244-1246, XP000783223 ISSN: 1041-1135.

Wysocki P F et al: "Broad-Band Erbium-Doped Fiber Amplifier Flattened Beyond 40 nm Using Long-Period grating Filter" IEEE Photonics Technology Letters, IEEE Inc. New York, US, vol. 9, No. 10, Oct. 1997, pp. 1343-1345, XP000721334 ISSN: 1041-1135.

Kakui M et al: "Gain-Flattened Hybrid Silica-Based Er-Doped Fiber Amplifiers Designed for More Than 25 nm Optical Bandwidth" IEICE Transactions on Electronics, Institute of Electronics Information and Comm. Eng. Tokyo, JP, vol. E81-C, No. 8, Aug. 1998 pp. 1285-1292, XP000848533 ISSN:0916-8524.

Livas J C et al: "High-power erbium-doped fibre amplifier with 975nm tapered-gain-region laser pumps" Jun. 23, 1994, Electronics Letters, IEE Stevenage, GB, p. 1054-1055, XP006000727 ISSN: 0013-5194.

Japanese Notice of Reasons for Rejection, w/ English translation thereof, issued in Japanese Patent Application No. 2006-136958 dated on Sep. 16, 2008.

Segi, T., et al. "Silica-based Composite Fiber Amplifier with 1480-1560nm Seamless Gain-band." Proc. 27th European Conference on Opt. Communication (ECOC'01-Amsterdam) vol. 2, Sep. 30, 2001, pp. 228-229, XP010582643.

Yamada, Makoto., et al. "Gain-Flattened Tellurite-Based EDFA with a Flat Amplification Bandwidth of 76 nm." IEEE Photonics Technology Letters, vol. 10, No. 9, Sep. 1998, pp. 1244-1246, XP000783223.

Wysocki, Paul, F., et al. "Broad-Band Erbium-Doped Fiber Amplifier Flattened Beyond 40nm Using Long-Period Grating Filter." IEEE Photonics, Technology Letters, vol.9, No. 10, Oct. 1997, pp. 1343-1345, XP000721334.

Segi, T., et al. "Silica-based Composite Fiber Amplifier with 1480-1560nm Seamless Gain-band" Proceedings of the 27th European Conference on Optical Communication (ECOC'01 Amsterdam) 2001, vol. 2, pp. 228-229.

Ishikawa, E., et al. "Novel 1500 nm-band EDFA with discrete Raman amplifier" Proceedings of the 27th European Conference on Optical Communication (ECOC'01 Amsterdam) 2001, vol. 6, pp. 48-49.

Japanese Office Action for Corresponding Japanese Application issued Nov. 22, 2005.

* cited by examiner

*Fig.4*

| OPTICAL FILTER | A | B | C |
|---|---|---|---|
| RELATIVE GAIN DEVIATION (%) | 3000 | 270 | 90 |
| WORST NOISE FIGURE (dB) | 7.3 | 6.4 | 6.6 |
| PUMPING EFFICIENCY (%) | 29.3 | 16.6 | 9.0 |

OPTICAL AMPLIFICATION MODULE, OPTICAL AMPLIFIER, OPTICAL COMMUNICATION SYSTEM, AND WHITE LIGHT SOURCE

CROSS-REFERENCE TO RELATED APPLICATION

This application claims priority to Provisional Application Ser. No. 60/364,112 filed on Mar. 15, 2002, which is hereby incorporated by reference in its entirety.

BACKGROUND OF THE INVENTION

1. Field of the Invention

The present invention relates to an optical amplification module including an optical waveguide having an optical waveguide region doped with a rare earth element, an optical amplifier or a white light source including the optical amplification module and means for supplying pumping light into the module, and an optical communication system including the optical amplifier.

2. Related Background Art

An optical communication system lets signal light propagate in an optical fiber transmission line to implement large-capacity high-speed transmission of information. As wavelength bands of the signal light in this optical communication system, the C-band (1530 nm to 1565 nm) is now under use, and use of the L-band (1565 nm to 1625 nm) is also under study. For the pursuit of greater capacity, use of the S-band (1460 nm to 1530 nm) is also under study as a wavelength band of the signal light.

In the optical communication system, an optical amplifier is used in order to amplify the signal light. An optical amplifier capable of amplifying the C-band or L-band signal light is an EDFA (Erbium-Doped Fiber Amplifier) using as an optical amplification medium an optical amplification fiber having an optical waveguide region doped with Er (erbium) (EDF: Erbium-Doped Fiber). When pumping light (in the 0.98 μm wavelength band or 1.48 μm wavelength band) is supplied into the EDF, the EDFA can amplify the C-band or L-band signal light propagating in the EDF.

On the other hand, a TDFA (Thulium-Doped Fiber Amplifier) using as an optical amplification medium an optical amplification fiber having an optical waveguide region doped with Tm (thulium) (TDF: Thulium-Doped Fiber), is under study as an optical amplifier capable of amplifying the S-band signal light. When the pumping light (in the 1.05 μm wavelength band, 1.2 μm wavelength band, 1.4 μm wavelength band, or 1.55-to-1.65 μm wavelength band) is supplied into the TDF, the TDFA can amplify the S-band signal light propagating in this TDF.

SUMMARY OF THE INVENTION

The inventors have studied conventional optical communication systems in detail and, and as a result, have found problems as follows.

The upper limit of the wavelength region of the signal light that the TDFA can amplify in practice is approximately 1510 nm (for example, reference is made to Document 1 "T. Kasamatsu, et al., "Laser-diode-pumped highly-efficient gain-shifted thulium-doped fiber amplifier operating in he 1480-1510-nm band," OFC2001, Technical Digest, TuQ4 (2001)"). On the other hand, the lower limit of the wavelength region of the signal light that the EDFA can amplify in general is approximately 1530 nm. Accordingly, the signal light in the wavelength region of 1510 nm to 1530 nm cannot be amplified by the use of only these EDFA and TDFA. For this reason, efficiency of utilization of the low-loss wavelength region is low in silica-based optical fibers used as optical fiber transmission lines.

Suggestions were thus made on the EDFA capable of amplifying the signal light near the wavelength region of 1490 nm to 1520 nm (for example, reference is made to Document 2 "E. Ishikawa, et al., "Novel 1500 nm-band EDFA with discrete Raman amplifier," ECOC2001, Post-deadline papers, pp. 48-49 (2001)," and Japanese Patent Application Laid-Open No. 2001-313433). The EDFA disclosed in these is arranged to enhance the population inversion and thereby amplify the signal light in the above-mentioned wavelength region.

This EDFA, however, has a very large positive gain inclination in the above-mentioned wavelength region and it is thus impossible to realize gain flattening singly. Therefore, it must be used in combination with a Raman amplifier to achieve gain flattening. Nevertheless, the Raman amplifier has problems of lower pumping efficiency, larger scale because of necessity for the fiber length of even several km, deterioration of transmission quality of signal light due to the nonlinear optical phenomena and double Rayleigh scattering in the optical fiber, and so on, as compared with the EDFA and TDFA.

The present invention has been accomplished in order to solve the above problems and an object of the invention is to provide an optical amplifier having flatter gain of amplification of signal light near the wavelength region of 1490 nm to 1520 nm than before, an optical amplification module which includes an optical waveguide having an optical waveguide region doped with a rare earth element and which can be suitably used in the optical amplifier, an optical communication system including the optical amplifier, and a white light source including the optical amplification module.

An optical amplification module according to the present invention has an amplification band within a range of 1490 nm to 1520 nm, and comprises a Tm-doped optical waveguide having an optical waveguide region doped with Tm, and an Er-doped optical waveguide optically connected to the Tm-doped optical waveguide and having an optical waveguide region doped with Er. An optical amplifier amplifies signal light entered through an input end thereof and outputting the amplified signal light from an output end thereof, and comprises the optical amplification module according to the present invention, including the Tm-doped optical waveguide and the Er-doped optical waveguide; first pumping light supply system for supplying pumping light of a wavelength capable of pumping Er ions, into the Er-doped optical waveguide; and second pumping light supply system for supplying pumping light of a wavelength capable of pumping Tm ions, into the Tm-doped optical waveguide.

According to the present invention, the first pumping light supply system supplies the pumping light of the wavelength capable of pumping Er ions, into the Er-doped optical waveguide and the second pumping light supply system supplies the pumping light of the wavelength capable of pumping Tm ions, into the Tm-doped optical waveguide. In the optical amplification module including the Er-doped optical waveguide and the Tm-doped optical waveguide, the signal light is amplified in both the Er-doped optical waveguide and the Tm-doped optical waveguide. Accordingly, the total gain spectrum is the sum of gain spectra of the respective Er-doped optical waveguide and Tm-doped optical waveguide. For this reason, the gain of amplification of signal light becomes flatter near the wavelength region of 1490 nm to 1520 nm than before.

Preferably, the optical amplification module according to the present invention further comprises a gain equalizing filter disposed upstream, downstream, or midstream of the Er-doped optical waveguide and equalizing gain of the Er-doped optical waveguide in a wavelength region within a region of 1490 nm to 1520 nm. In this case, the gain equalizing filter makes the gain of amplification of signal light much flatter near the region of 1490 nm to 1520 nm.

Preferably, the optical amplification module according to the present invention further comprises a cutoff filter arranged upstream, downstream, or midstream of the Er-doped optical waveguide and cutting off light in a wavelength band of 1530 nm or more. In this case, the cutoff filter cuts off spontaneous emission in the wavelength band of 1530 nm or more to prevent the spontaneous emission from being outputted to downstream.

Preferably, the optical amplification module according to the present invention further comprises a first optical coupler for supplying 0.98 μm-band pumping light into the Er-doped optical waveguide. This configuration is preferable in enhancing the population inversion in the Er-doped optical waveguide.

Preferably, the optical amplification module according to the present invention further comprises a second optical coupler for supplying 1.05 μm-wavelength-band or 1.4 μm-wavelength-band pumping light and 1.2 μm-wavelength-band or 1.55-to-1.65 μm-wavelength-band pumping light into the Tm-doped optical waveguide. This configuration is preferable in shifting a gain peak to the longer wavelength side.

An optical amplification module according to the present invention comprises an Er-doped optical waveguide having an optical waveguide region doped with Er; and temperature adjustor for maintaining temperature of the Er-doped optical waveguide at or above room temperature. This configuration is preferable in enhancing the gain of the Er-doped optical waveguide. Preferably, the temperature adjustor maintains the temperature of the Er-doped optical waveguide at or above 65° C. This configuration is preferable in permitting use of an inexpensive heater.

The optical amplification module according to the present invention may include an Er-doped optical waveguide having an optical waveguide region co-doped with $Al_2O_3$ and $P_2O_5$ together with Er. In this case, the optical amplification module amplifies signal light of multiple channels in a signal wavelength band in which a wavelength band of 1490 nm-1520 nm is included. Also, in S-band, a wavelength dependence of stimulated-emission cross sectional area can be flattened, and therefore the flattening of gain becomes easy.

In the optical amplification module according to the present invention, preferably, each of the Tm-doped optical waveguide and the Er-doped optical waveguide may includes an optical fiber. This configuration is preferable in capability of readily lengthening the waveguide length and capability of enhancing the gain.

An optical amplifier according to the present invention comprises an Er-doped optical waveguide having an optical waveguide region doped with Er; and pumping light supply system for supplying pumping light of a 0.98 μm band not less than the wavelength of 976 nm, into the Er-doped optical waveguide. In this case, improvement is achieved in the gain in the Er-doped optical waveguide in the wavelength region of 1490 nm to. 1520 nm.

In the optical amplifier according to the present invention, preferably, the Er-doped optical waveguide is arranged upstream of the Tm-doped optical waveguide. In this case, the power of the signal light entered into the front stage of Er-doped optical waveguide becomes lower to enhance the population inversion in the Er-doped optical waveguide, while the power of the signal light entered into the rear stage of Tm-doped optical waveguide becomes higher to cause gain saturation in the Tm-doped optical waveguide. Therefore, this configuration is advantageous in shifting the wavelength of the gain peak to the longer side in the Tm-doped optical waveguide.

An optical communication system according to the present invention comprises the optical amplifier according to the present invention, and transmits signal light of a plurality of channels in a signal wavelength band within the range of 1490 nm to 1520 nm, wherein the optical amplifier amplifies the signal light in the above wavelength region. Since this optical communication system amplifies the signal light in the region of 1490 nm to 1520 nm by the optical amplifier according to the present invention, the unused wavelength region is narrower than before, so as to permit transmission/reception of larger capacity of information.

In the optical communication system according to the present invention, preferably, the signal wavelength band includes a plurality of bands spaced by one or more unused wavelength regions with a bandwidth of 4 nm to 6 nm. In this case, the unused wavelength region with the bandwidth of this range becomes optimal in terms of the fluorescent properties of the respective Er element and Tm element and in terms of the characteristics of an optical multiplexer and an optical demultiplexer.

In the optical communication system according to the present invention, preferably, pumping light for Raman amplification in the unused wavelength region is supplied into an optical transmission line to Raman-amplify the signal light in the optical transmission line. In this case, the total gain spectrum can be further flattened and it is also feasible to suppress the negative effect on the signal light due to Rayleigh scattering of the Raman amplification pumping light.

A white light source according to the present invention comprises the optical amplification module according to the present invention, including the Tm-doped optical waveguide and the Er-doped optical waveguide; first pumping light supply system for supplying pumping light of a wavelength capable of pumping Er ions, into the Er-doped optical waveguide; and second pumping light supply system for supplying pumping light of a wavelength capable of pumping Tm ions, into the Tm-doped optical waveguide, the white light source outputting spontaneous emissions generated in the respective Tm-doped optical waveguide and Er-doped optical waveguide by supplying the pumping light. The white light source is constructed in much the same structure as the optical amplifier, but the white light source receives no input of signal light and outputs the spontaneous emissions generated in the respective Tm-doped optical waveguide and Er-doped optical waveguide. This white light source can output white light in the wavelength region of 1.45 μm to 1.61 μm.

The present invention will be more fully understood from the detailed description given hereinbelow and the accompanying drawings, which are given by way of illustration only and are not to be considered as limiting the present invention.

Further scope of applicability of the present invention will become apparent-from the detailed description given hereinafter. However, it should be understood that the detailed description and specific examples, while indicating preferred embodiments of the invention, are given by way of illustration

BRIEF DESCRIPTION OF THE DRAWINGS

FIG. 4 is a table as a list of various characteristics of the EDFA part in the optical amplifier shown in FIG. 1;

DETAILED DESCRIPTION OF THE PREFERRED EMBODIMENTS

Embodiments of the present invention will be described below in detail with reference to FIGS. 1, 2, 3A, 3B, 4-6, 7A-8B, 9-11, 12A, 12B, 13, 14, 15A-15C and 16. The same reference symbols will denote the same elements and redundant description will be omitted throughout the description of the drawings.

Figure 1:
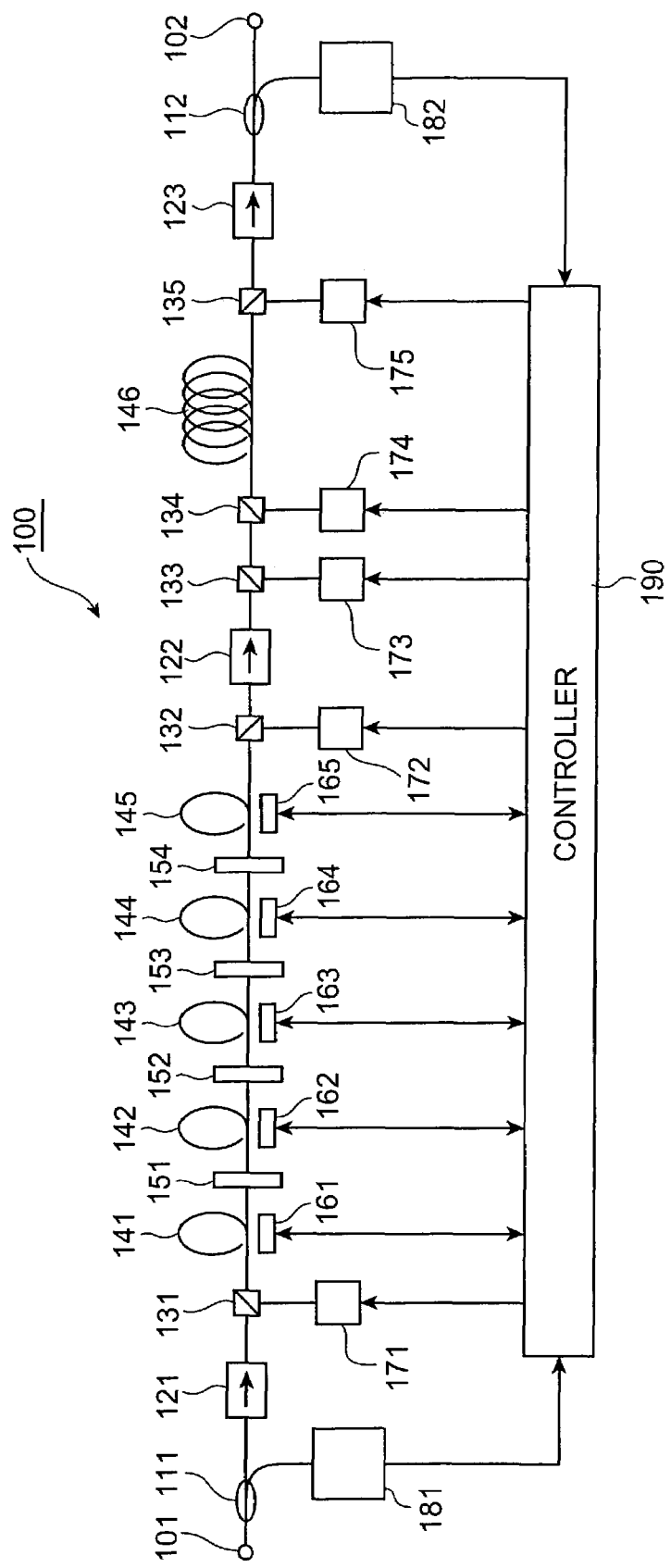
FIG. 1 is a view showing the structure of the optical amplifier according to the present invention.

FIG. 1 is a view showing the structure of an optical amplifier according to the present invention. The optical amplifier 100 shown in FIG. 1 comprises the following elements in the order named on a signal light propagation path from an input end 101 to an output end 102: optical branching device 111, optical isolator 121, optical coupler 131, EDF 141, optical filter 151, EDF 142, optical filter 152, EDF 143, optical filter 153, EDF 144, optical filter 154, EDF 145, optical coupler 132, optical isolator 122, optical coupler 133, optical coupler 134, TDF 146, optical coupler 135, optical isolator 123, and optical branching device 112.

This optical amplifier 100 also comprises a temperature adjusting section 161 for adjusting the temperature of the EDF 141, a temperature adjusting section 162 for adjusting the temperature of the EDF 142, a temperature adjusting section 163 for adjusting the temperature of the EDF 143, a temperature adjusting section 164 for adjusting the temperature of the EDF 144, a temperature adjusting section 165 for adjusting the temperature of the EDF 145, a pumping light source 171 connected to the optical coupler 131, a pumping light source 172 connected to the optical coupler 132, a pumping light source 173 connected to the optical coupler 133, a pumping light source 174 connected to the optical coupler 134, a pumping light source 175 connected to the optical coupler 135, a signal light detecting section 181 connected to the optical branching device 121, a signal light detecting section 182 connected to the optical branching device 122, and a controller 190. The components on the signal light propagating circuit and the temperature adjusting sections 161 to 165 constitute an optical amplification module according to the present embodiment.

The EDFs 141 to 145 each are optical waveguides of silica glass as a host glass, and at least the core region is doped with Er. Each of these EDFs 141 to 145 can amplify the C-band signal light by supplying pumping light of a wavelength capable of pumping Er ions. The TDF 146 is an optical waveguide of fluoride-based glass or tellurate-based glass as a host glass, and at least the core region is doped with Tm. The TDF 146 of these materials can amplify the S-band signal light by supplying the pumping light of a wavelength capable of pumping Tm ions.

The optical couplers 131, 132 and the pumping light sources 171, 172 act as pumping light supply system for supplying the pumping light into the EDFs 141 to 145. The wavelength band of the pumping light is the 0.98 μm band or the 1.48 μm band. Semiconductor laser sources are suitably used as the pumping light sources 171, 172. The optical coupler 131 outputs the pumping light from the pumping light source 171 toward the EDF 141 and also outputs the signal light from the optical isolator 121 toward the EDF 141. The optical coupler 132 outputs the pumping light from the pumping light source 172 toward the EDF 145 and also outputs the light coming from the EDF 145, toward the optical isolator 122.

The optical couplers 133 to 135 and the pumping light sources 173 to 175 act as pumping light supply system for supplying the pumping light into the TDF 146. The wavelength band of the pumping light is the 1.05 μm band, the 1.2 μm band, the 1.4 μm band, or the 1.55-to-1.65 μm band. Light sources suitably applicable as the pumping light sources 173 to 175 are selected from LD-pumped Nd:YLF laser light sources, Nd:YAG laser light sources, Yb laser light sources, semiconductor laser light sources, and so on. The optical coupler 133 outputs the pumping light from the pumping light source 173 toward the optical coupler 134 and also outputs the signal light coming from the optical isolator 122, toward the optical coupler 134. The optical coupler 134 outputs the pumping light from the pumping light source 174 toward the TDF 146 and also outputs the light coming from the optical coupler 133, toward the TDF 146. The optical coupler 135 outputs the pumping light from the pumping light source 175 toward the TDF 146 and also outputs the light traveling from the TDF 146, toward the optical isolator 123.

Each of the optical isolators 121 to 123 allows light to pass in the forward direction (the direction directed from the input end 101 to the output end 102), but does not allow light to pass in the opposite direction.

The optical filters 151 to 154 each are gain equalizing filters for equalizing the gain of the EDFs 141 to 145 in a wavelength region included in the wavelength band of 1490 nm to 1520 nm and cutoff filters for cutting off light in the wavelength band of not less than the wavelength of 1530 nm as well.

The optical branching device 111 is arranged on the optical path between the input end 101 and the optical isolator 121 and functions to separate part of the power of the light entered through the input end 101 and output the branch light toward the signal light detecting section 181. The signal light detecting section 181 receives the input light from the optical branching device 111 and detects the power of the signal light entered through the input end 101. This signal light detecting section 181 may detect the wave number of the signal light.

The optical branching device 112 is arranged on the optical path between the optical isolator 123 and the output end 102 and functions to separate part of the power of the light from the output end 102 and output the branch light toward the signal light detecting section 182. The signal light detecting section 182 receives the input light traveling from the optical branching device 112 and detects the power of the signal light from the output end 102. This signal light detecting section 182 may detect the channel number of the signal light.

The temperature adjusting section 161 (temperature adjustor) detects the temperature of the EDF 141 and maintains the temperature of the EDF 141 at or above room temperature on the basis of the result of the detection. The temperature adjusting section 162 (temperature adjustor) detects the temperature of the EDF 142 and maintains the temperature of the EDF 142 at or above room temperature on the basis of the result of the detection. The temperature adjusting section 163 (temperature adjustor) detects the temperature of the EDF 143 and maintains the temperature of the EDF 143 at or above room temperature on the basis of the result of the detection. The temperature adjusting section 164 (temperature adjustor) detects the temperature of the EDF 144 and maintains the temperature of the EDF 144 at or above room temperature on the basis of the result of the detection. The temperature adjusting section 165 (temperature adjustor) detects the temperature of the EDF 145 and maintains the temperature of the EDF 145 at or above room temperature on the basis of the result of the detection. Particularly, the temperature adjusting sections 161 to 165 are preferably configured to maintain the temperature of the EDFs 141 to 145 at or above 65° C.

The controller 190 receives the results of the detection by the signal light detecting sections 181, 182 and adjusts the power of the pumping light outputted from each of the pumping light sources 171 to 175. The controller 190 also controls the temperature adjusting sections 161 to 165 for adjusting the temperature of the EDFs 141 to 145.

In this optical amplifier 100, the pumping light outputted from the pumping light sources 171, 172 is supplied into the EDFs 141 to 145. The pumping light outputted from the pumping light sources 173 to 175 is supplied into the TDF 146. The signal light entered through the input end 101 propagates in order through the optical branching device 111, optical isolator 121, and optical coupler 131, thereafter is amplified in the EDFs 141 to 145, and is gain-equalized in the optical filters 151 to 154. This amplified signal light propagates through the optical coupler 132, optical isolator 122, optical coupler 133, and optical coupler 134, thereafter is amplified in the TDF 146, and propagates through the optical coupler 135, optical isolator 123, and optical branching device 112 to be outputted from the output end 102.

The following will describe a more specific configuration of the optical amplifier 100 according to the present invention. In this configuration, the signal light entered through the input end 101 is forty channels with the frequency interval of 100 GHz included in the wavelength band of 1489.3 nm to 1518.7 nm, wherein the power of the signal light of each channel is −21 dBm and the total power is −5 dBm.

A specific configuration of the EDFA part is as follows. The total unsaturated absorption of the EDFs 141 to 145 is 140 dB and the unsaturated absorption of each EDF is one fifth thereof. The pumping light supplied from each of the pumping light sources 171, 172 into the EDFs 141 to 145 has the wavelength in the 0.98 μm band and the power of +24 dBm.

Figure 2:
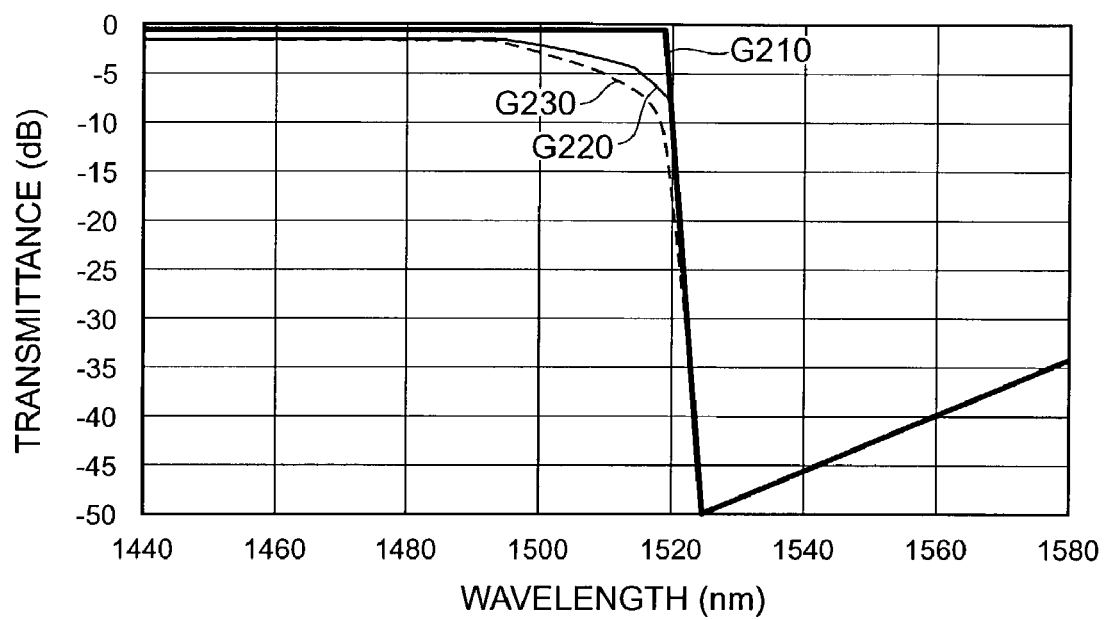
FIG. 2 is a graph showing the transmission characteristics of the optical filters included in the optical amplifier shown in FIG. 1.

The optical filters 151 to 154 have the transmission characteristics shown in FIG. 2. In this case, three types of optical filters are assumed for the optical filters 151 to 154. Each of the optical filters A to C used as the optical filters 151 to 154 cuts off the light of not less than 1525 nm with high efficiency. In FIG. 2, the curve G210 indicates a transmission characteristic of the optical filter A, and the optical filter A transmits the light of not more than 1520 nm with little loss. The curve G220 indicates a transmission characteristic of the optical filter B, and the optical filter B demonstrates the loss inclined in the wavelength band of 1500 nm to 1520 nm. The curve G230 indicates a transmission characteristic of the optical filter C, and the optical filter C has a greater loss inclination. The optical filters with such transmission characteristics can be substantiated by lengthening an index modulation forming region in a long period grating with long-period index modulation formed in an optical fiber.

Figure 3A:
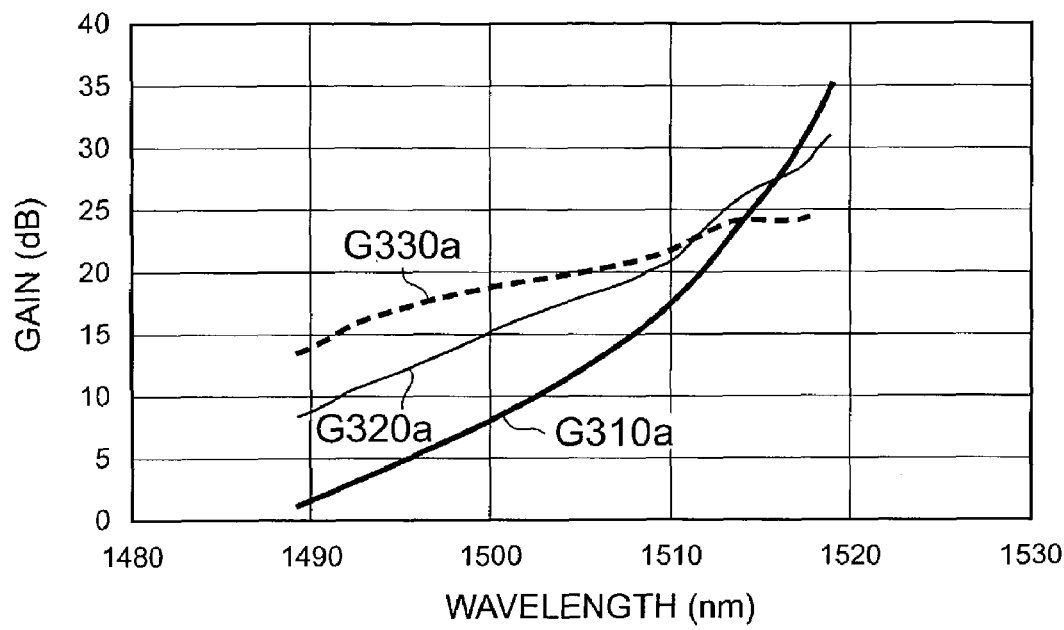
FIGS. 3A and 3B are graphs showing the gain characteristics and noise figure characteristics of the EDFA part in the optical amplifier shown in FIG. 1, respectively.
Figure 3B:
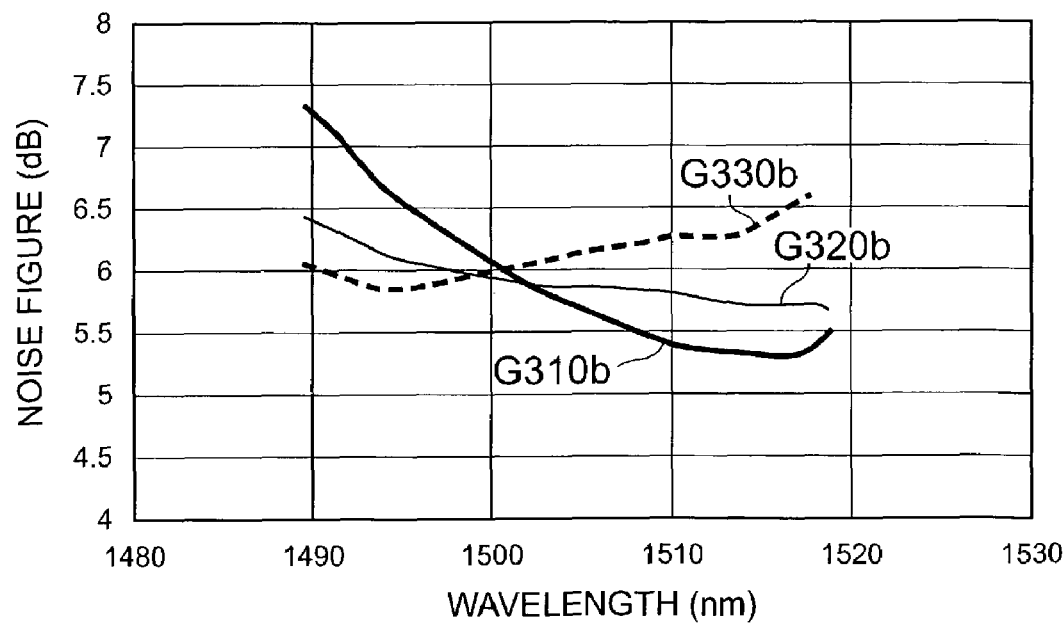

FIGS. 3A and 3B are graphs showing the gain characteristics and noise figure characteristics of the EDFA part in the optical amplifier according to the present invention. FIG. 4 is a table as a list of various characteristics of the EDFA part in the optical amplifier according to the present invention. These figures show the characteristics in the wavelength region of 1490 nm to 1520 nm in the cases where each type of the optical filters A to C was applied to the optical filters 151 to 154. FIG. 4 presents the relative gain deviation, which is a value obtained by dividing the gain deviation (dB) by the minimum gain deviation (dB), the worst value of noise figure in the signal wavelength band, and the pumping efficiency, which is a value obtained by dividing an increase of the power of the signal light by the power of the pumping light. Specifically, in FIG. 3A, the curve G310a indicates the gain of the optical filter A, the curve G320a indicates the gain of the optical filter B, and the curve G330a indicates the gain of the optical filter C. Also, in FIG. 3B, the curve G310b indicates the noise figure of the optical filter A, the curve G320b indicates the noise figure of the optical filter B, and the curve G330b indicates the noise figure of the optical filter C.

As seen from these figures, the gain of the EDFA part in the wavelength band of 1490 nm to 1520 nm has a very large positive inclination. The relative gain deviation of the normal C-band EDFA is not more than 20%, whereas the relative gain deviation of the EDFA part in the above-mentioned wavelength band is very large, 3000%, 270%, and 90%. The relative gain deviation of the EDFA described in Document 2 is also large, 56%. Improvement can be made in the gain inclination by increasing the loss in the signal wavelength band of the optical filters 151 to 154, but in that case the pumping efficiency becomes heavily degraded. The pumping efficiency of the normal C-band EDFA is 50% to 60% and the pumping efficiency of the normal L-band EDFA is about 40%. Therefore, the pumping efficiency of not more than 10% as in this case is impractical.

It is difficult to improve the optical amplification characteristics by only the EDFA part, as described above, but the optical amplifier according to the present embodiment also has the TDFA part in addition to the EDFA part, thereby improving the optical amplification characteristics.

Figure 5:
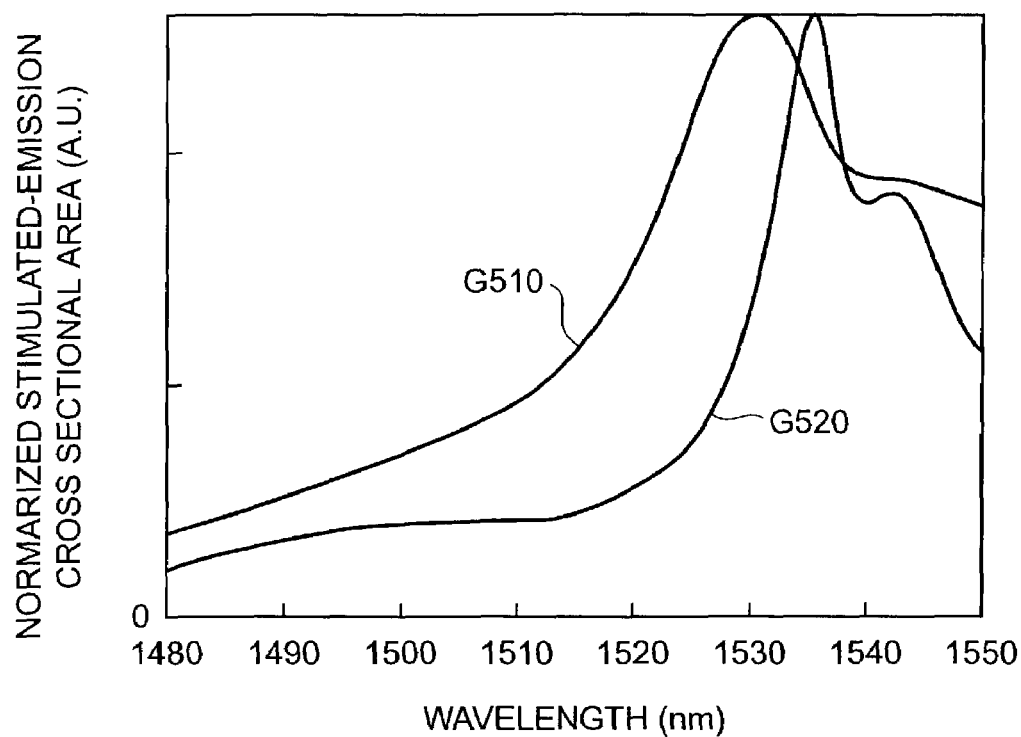
FIG. 5 is a graph showing the normalized stimulated-emission cross sectional area of respective Al-doped EDF and P/Al-co-doped EDF.

In the EDF for S-band, the population inversion has to be maintained at near 100%, and therefore the shape of gain spectrum (dB) approximately proportional to the stimulated-emission cross sectional area (linear). In the Al-doped EDF used in general, the wavelength dependence of the stimulated-emission cross sectional area, as shown in FIG. 5, indicates a steep slope at the periphery of 1.5 μm wavelength band. FIG. 5 is a graph showing the wavelength dependence of the normalized stimulated-emission cross sectional area, and in FIG. 5, the curve G510 indicates the normalized stimulated-emission cross sectional area of Al-doped EDF, and the curve G520 indicates the normalized stimulated-emission cross sectional area of P/Al-co-doped EDF.

Figure 6:
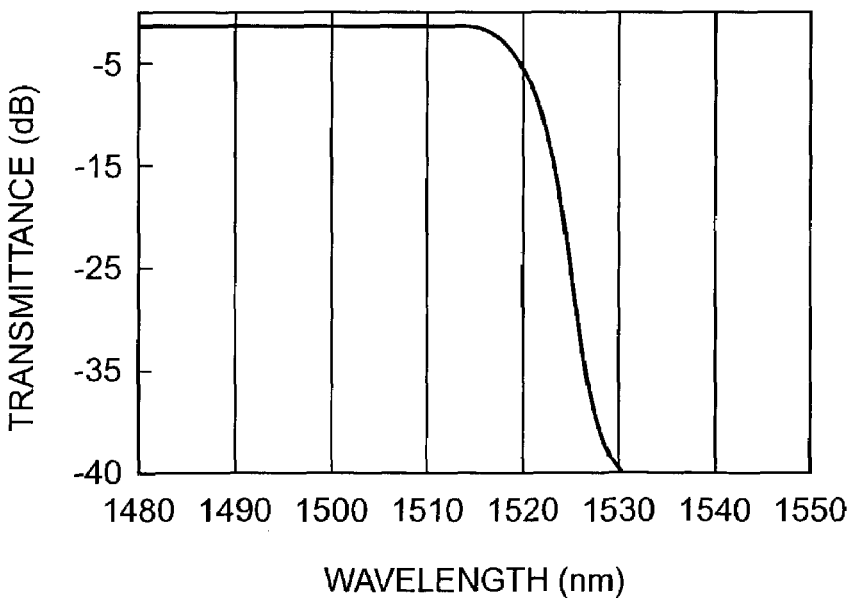
FIG. 6 shows the transmission spectrum of an optical filter for P/Al-co-doped EDF.

As a result, to realize a flat gain spectrum suitable to WDM (Wavelength Division Multiplexing) transmission, a gain equalizing filter, which can remove C-band such as showing I FIG. 6 and has a loss slope in the S-band signal wavelength band like the optical filters B and C (see FIG. 2), may be necessary. Therefore, in the wavelength near 1.52 μm, the occurrence of a large insertion loss in the optical amplifier makes the realizing of flat gain spectrum be difficult in views of pumping coefficiency and noise figure.

The shape of stimulated-emission cross sectional area of EDF can be changed by changing the formation such as most glass, dopants, and the like. For example, in the P/Al-co-doped EDF shown in FIG. 5, it has an approximately flat stimulated-emission cross sectional area at the wavelength band of 1.49 μm to 1.52 μm, and therefore the gain flattening can be obtained without a specific gain equalizer having the transmission characteristic shown in FIG. 2. Quantitatively, the ratio of the stimulated-emission cross sectional area at 1.49 μm band and 1.52 μm band is 2.9 in the case of Al-doped EDF, and is 1.6 in the case of P/Al-co-doped EDF. As a specific configuration of the optical amplifier 100, it can be considered the use of an optical filter having a transmission spectrum shown in FIG. 6 for C-band ASE removing only.

Figure 7A:
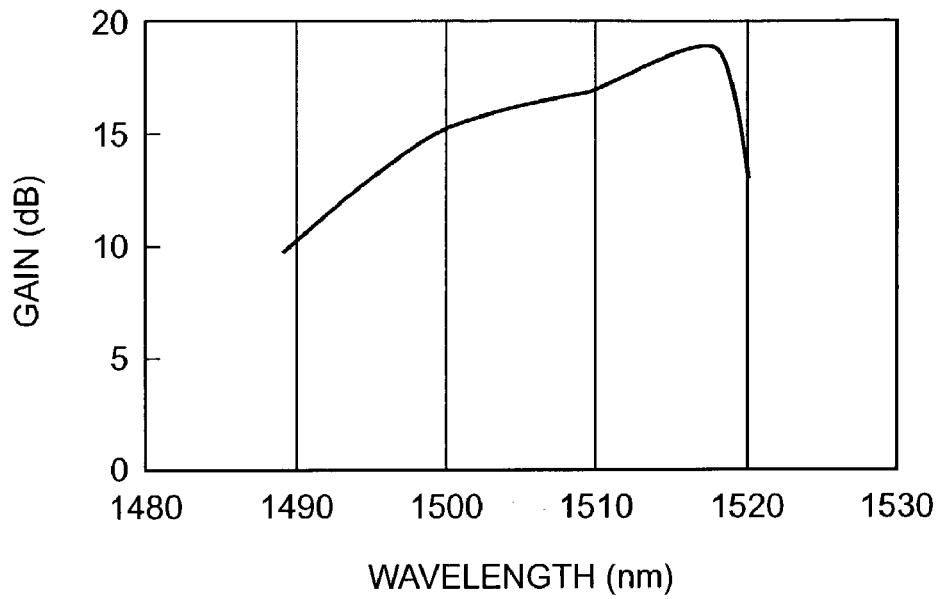
FIGS. 7A and 7B are graphs showing the gain and the noise figure of P/Al-co-doped EDF for S-band amplification, respectively.
Figure 7B:
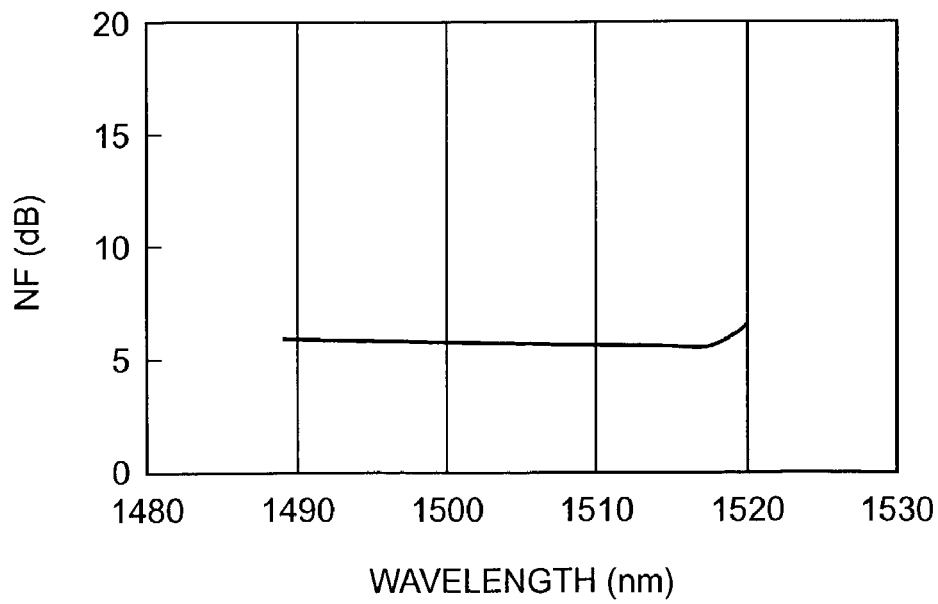

Next, the gain spectrum and noise figure of the optical amplifier, in which the silica-based P/Al-co-doped EDF having a total unsaturated absorption peak of 170 dB is divided equally five parts and the optical filters having a transmission spectrum shown in FIG. 6 are inserted at the gaps between the equally divided five parts, are shown in FIGS. 7A and 7B. As the operating conditions, the signal light entered through the input end 101 is forty channels with the frequency interval of 100 GHz included in the wavelength band of 1489.3 nm to 1518.7 nm, wherein the power of the signal light of each channel is −21 dBm and the total power is −5 dBm. In this operating conditions, the relative gain deviation was 87%, the pumping coefficiency was 11.5%, and the noise figure was 6.6 dB. As compared with the result of FIGS. 3A, 3B and 4, even when the gain deviation and noise figure are approximately equal, it can be seen that the pumping coefficiency was improved at about 30% from 9.0% to 11.5%. This result comes from the suppression of the insertion loss of the optical filters at the signal wavelength band. Moreover, Yb may be co-doped in the above mentioned the P/Al-co-doped EDF in order to improve the absorption per unit length around the wavelength of 0.98 μm. Yb-ions act as sensitizers when they co-exist with P-ions.

On the other hand, a specific configuration of the TDFA part is as follows. The TDF 146 contains Tm in the doping concentration of 2000 wt·ppm and has the length of 45 m. The pumping light supplied from each of the pumping light sources 174, 175 into the TDF 146 has a wavelength in the 1.05 μm band and the power of +23 dBm. The pumping light supplied from the pumping light source 173 into the TDF 146 has a wavelength in the 1.56 μm band and the power of 55 mW.

Figure 8A:
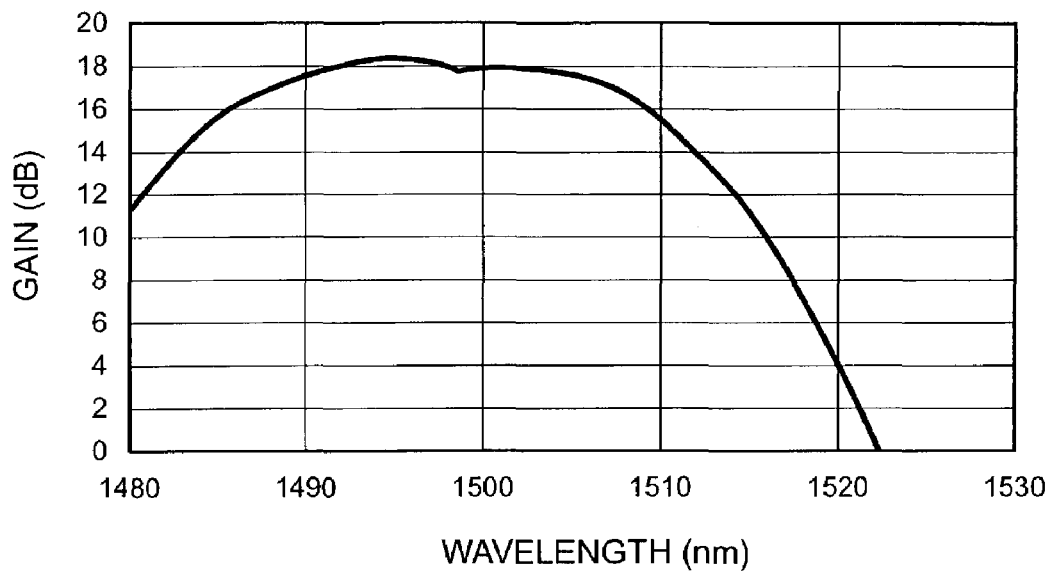
FIGS. 8A and 8B are graphs showing the gain characteristics and noise figure characteristics of the TDFA part in the optical amplifier shown in FIG. 1, respectively.
Figure 8B:
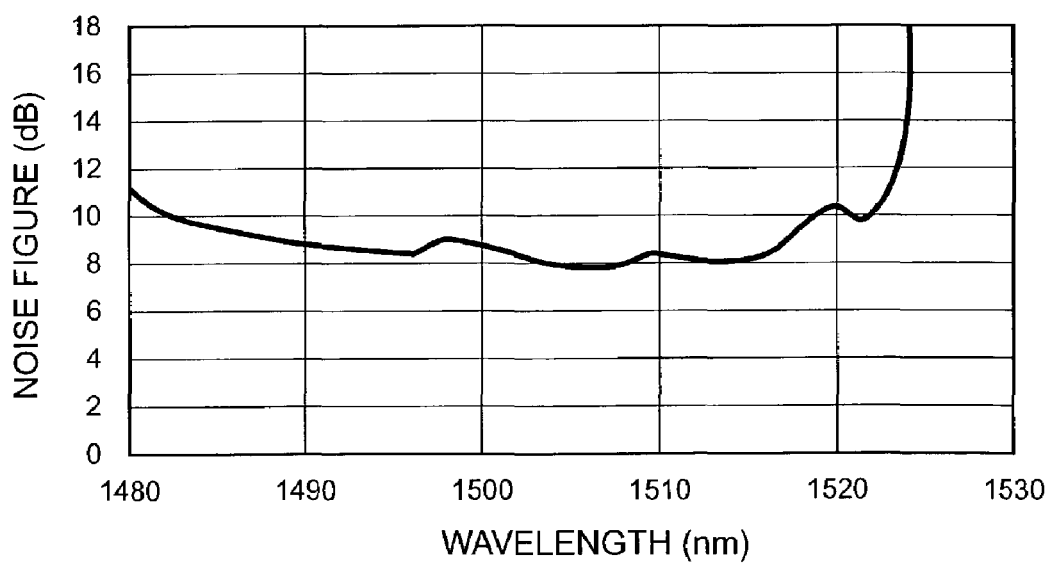

FIGS. 8A and 8B are graphs showing the gain characteristics and noise figure characteristics of the TDFA part in the optical amplifier 100 according to the present invention. As seen from these figures, the TDFA part also has the gain in the wavelength band of 1490 nm to 1520 nm. However, the gain of the TDFA part in this band has a negative inclination the absolute value of which is large.

Figure 9:
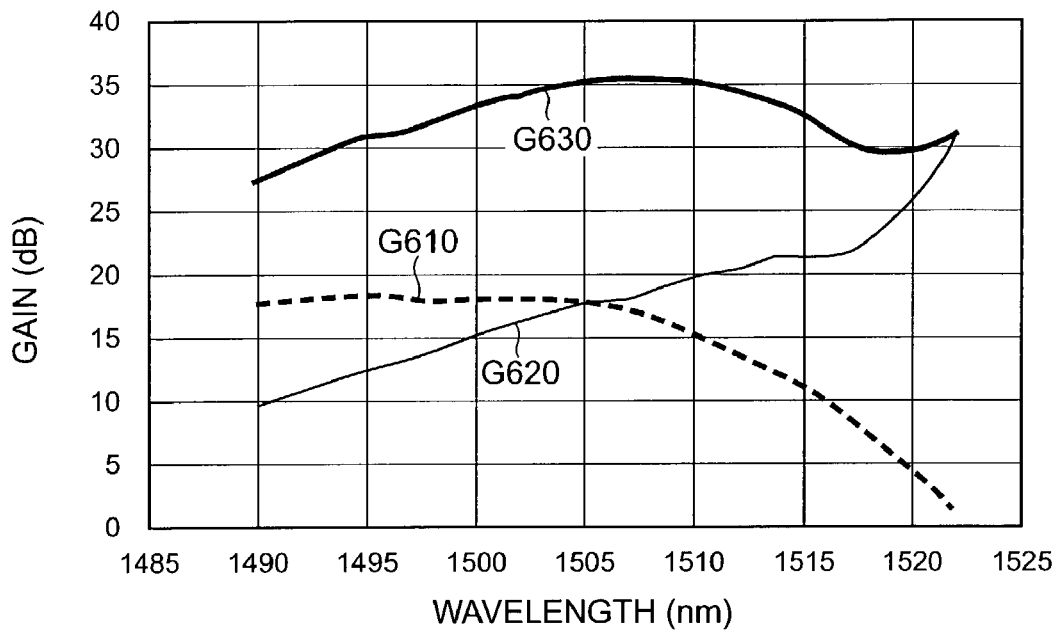
FIG. 9 is a graph showing the total gain characteristics of the optical amplifier shown in FIG. 1.
Figure 10:
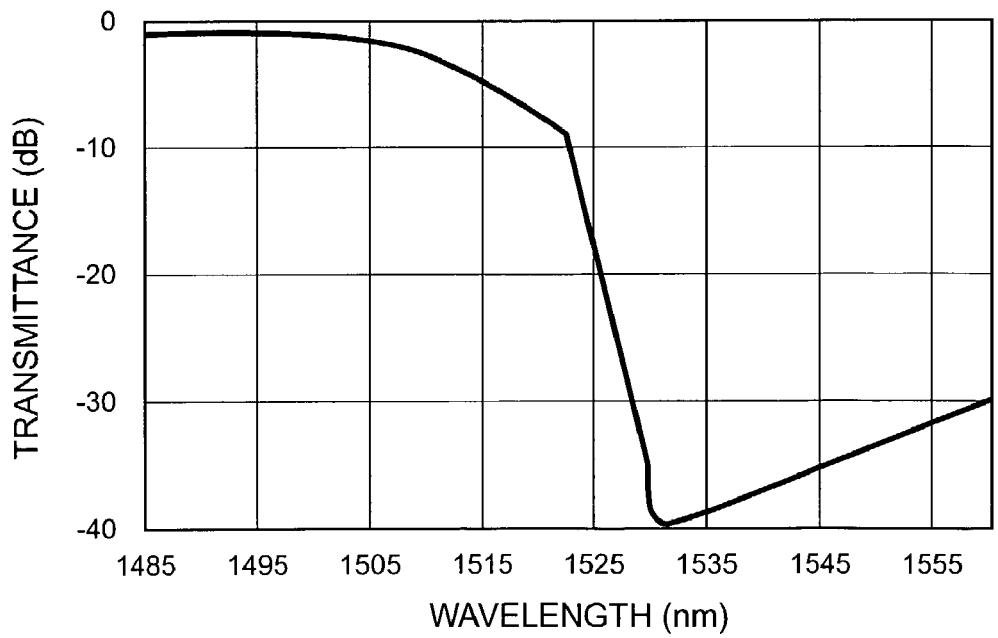
FIG. 10 is a graph showing the transmission characteristics of the optical filters included in the optical amplifier of FIG. 1.

FIG. 9 is a graph showing the total gain characteristics of the optical amplifier 100 according to the present invention and FIG. 10 is a graph showing the transmission characteristics of the optical filters 151 to 154 in this case. In FIG. 9, the curve G610 indicates the gain of TDFA part, the curve G620 indicates the gain of EDFA part, and the curve G630 indicates the total gain of the optical amplifier 100. As shown in FIG. 9, the positive gain inclination of the EDFA part and the negative gain inclination of the TDFA part cancel each other out in the wavelength region of 1490 nm to 1520 nm, so that the total relative gain deviation of the optical amplifier 100 is reduced to 25%, thus flattening the total gain of the optical amplifier 100.

The total gain of the optical amplifier 100 can be further flattened by selecting better transmission characteristics of the optical filters 151 to 154. The optical filters 151 to 154 may have the transmission characteristics identical with each other, but they may have the transmission characteristics different from each other.

In the optical amplifier 100 having the TDFA part and the EDFA part, it is preferable to locate the EDFA part upstream, as shown in FIG. 1. This configuration is advantageous in shifting the wavelength of the gain peak to the longer side in the TDFA part for the following reason: the power of the signal light entered to the front stage of EDFA becomes lower to enhance the population inversion in the EDFs 141 to 145, while the power of the signal light entered to the rear stage of TDFA becomes higher to cause the gain saturation in the TDF 146.

Figure 11:
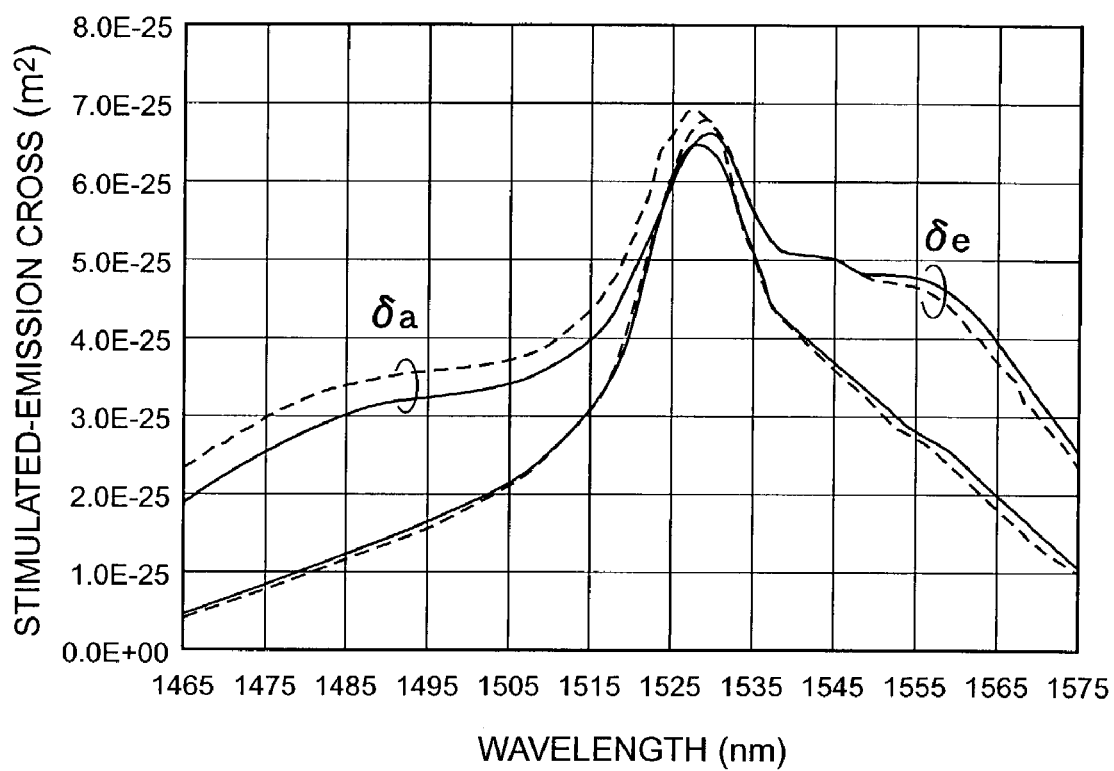
FIG. 11 is a graph showing the wavelength dependence of stimulated-emission cross sectional area $\sigma_e$ and absorption cross section $\sigma_a$ of the EDFs.

As seen from FIG. 9, it is desirable that the gain of the optical amplifier 100 be much greater near the wavelength of 1490 nm. For that purpose, it is preferable to maintain the temperature of the EDFs 141 to 145 high. FIG. 11 is a graph showing the wavelength dependence of stimulated-emission cross section $\sigma_e$ and absorption cross section $\sigma_a$ of the EDFs. In this figure, solid lines represent the results at the temperature of 75° C. and dashed lines the results at the room temperature of 25° C. In the wavelength region of 1490 nm to 1520 nm, the stimulated-emission cross section $\sigma_e$ of the EDFs demonstrates weak temperature dependence, while the absorption cross section $\sigma_a$ of the EDFs does strong temperature dependence. The higher the temperature, the smaller the absorption cross section $\sigma_a$ of the EDFs. For this reason, the gain is improved, particularly, on the short wavelength side by maintaining the temperature of the EDFs 141 to 145 high, as shown in FIG. 11. The pumping efficiency was 9.0% at the temperature of 25° C., whereas that was 10.6% at the temperature of 75° C., thus achieving the improvement of about 0.7 dB. The temperature adjusting sections 161 to 165 are provided for maintaining the temperature of the EDFs 141 to 145 high and, for example, Peltier devices, heaters, etc. are used as the temperature adjusting sections. In general, the ambient temperature specifications are 0° C. to 65° C. for the devices used in the optical communication systems. Therefore, when the set temperature of the EDFs 141 to 145 is 65° C. or higher, the system necessitates no cooling and thus allows use of inexpensive heaters, thereby becoming low in cost.

Figure 12A:
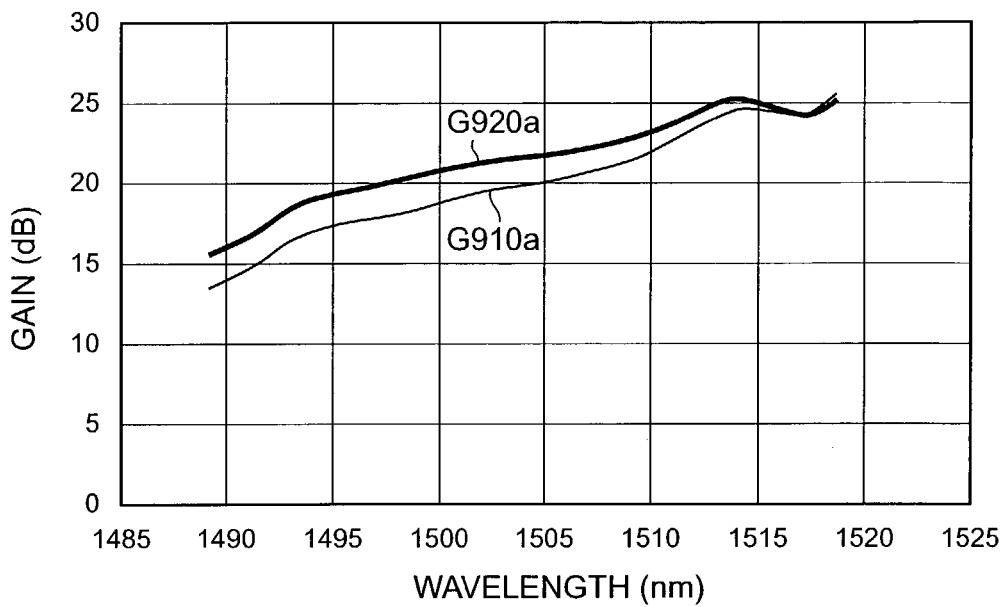
FIGS. 12A and 12B are graphs showing the gain characteristics and noise figure characteristics of the EDFA part in the respective cases of temperatures of 25° C. and 75° C., respectively.
Figure 12B:
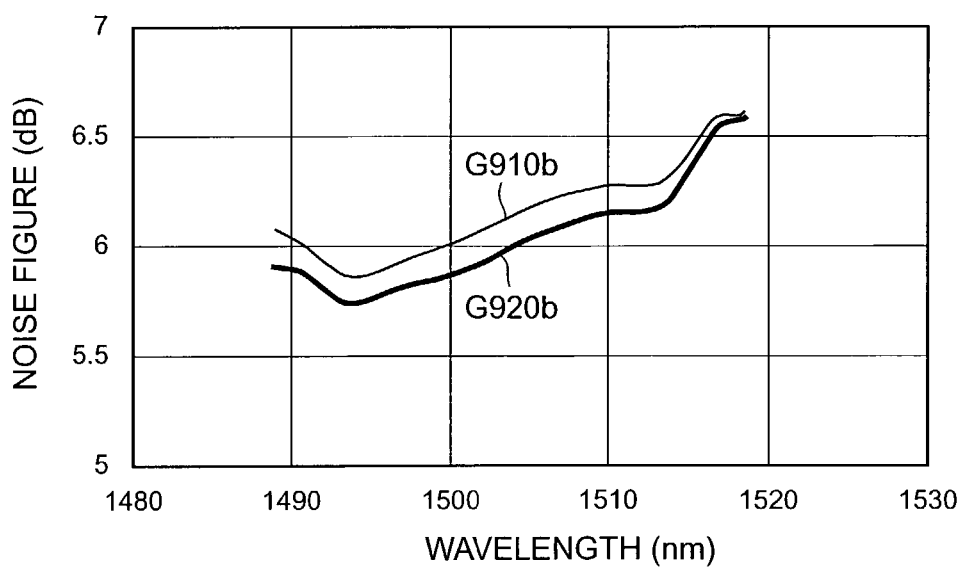

FIGS. 12A and 12B are graphs showing the optical amplification characteristics of the EDFA for S-band when increasing the temperature of EDF. In FIG. 12A, the curve G910a indicates the gain spectrum of the EDFA part at 25° C., and the curve G920a indicates the gain spectrum of the EDFA part at 75° C. Also, in FIG. 12B, the curve G910b indicates the noise figure of the EDFA part at 25° C., and the curve G920a indicates the noise figure of the EDFA part at 75° C. As operating conditions, the signal light entered through the input end 101 is forty channels with the frequency interval of 100 GHz included in the wavelength band of 1489.3 nm to 1518.7 nm, wherein the power of the signal light of each channel is −21 dBm and the total power is −5 dBm.

A specific configuration of the EDFA part is as follows. The total unsaturated absorption peak of the silica-based Al-doped EDF corresponding to the EDFs 141 to 145 is 140 dB. The pumping light supplied from each of the pumping light sources 171, 172 into the EDFs 141 to 145 has the wavelength in the 0.98 μm band and the power of +24 dBm. The optical filters 151 to 154 have the transmission characteristic corresponding to the curve G320 of FIG. 2.

Figure 13:
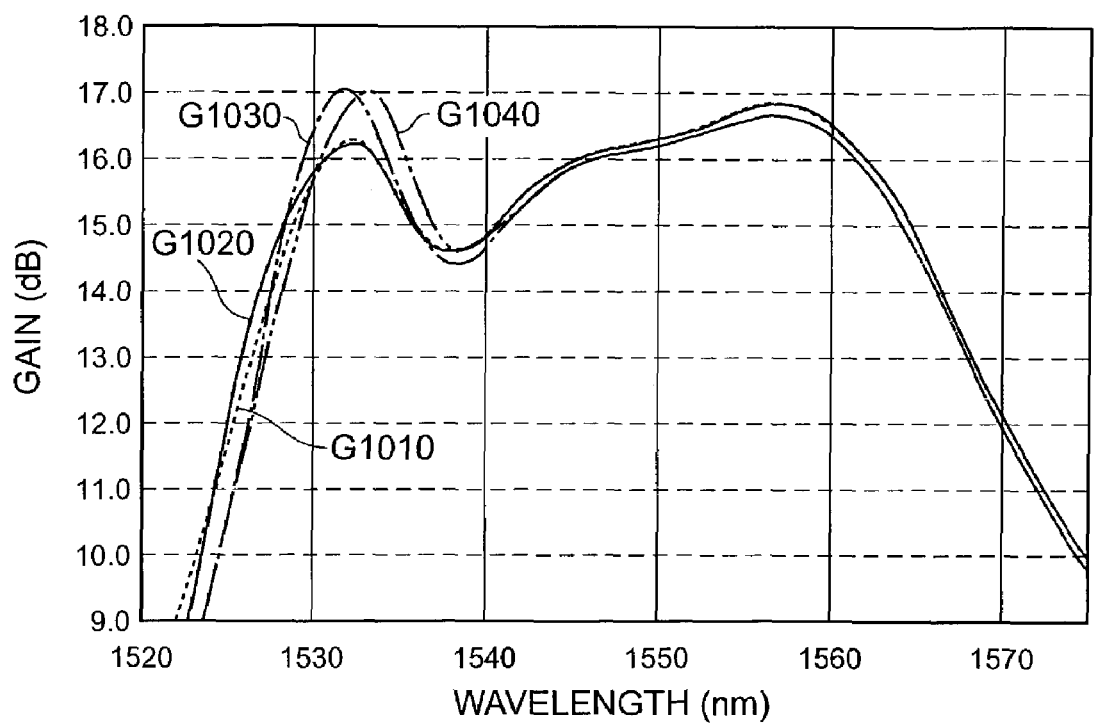
FIG. 13 is a graph showing the gain characteristics of the EDFA part in the cases where the wavelength of the pumping light is each of 974 nm, 976 nm, 978 nm, and 980 nm.

The gain spectrum of the EDFA part in the band shorter than the wavelength of 1.53 μm varies its profile, depending upon the wavelength of the 0.98 μm-band pumping light. FIG. 13 is a graph showing the gain characteristics of the EDFA part in the cases where the wavelength of the pumping light is each of 974 nm, 976 nm, 978 nm, and 980 nm. Specifically, in FIG. 10, the curve G1010 indicates the gain spectrum when supplying the pumping light of 974 nm at the power of 230 mW, the curve G1020 indicates the gain spectrum when supplying the pumping light of 976 nm at the power of 240 mW, the curve G1030 indicates the gain spectrum when supplying the pumping light of 978 nm at the power of 240 mW, and the curve G1040 indicates the gain spectrum when supplying the pumping light of 980 nm at the power of 240 mW. As seen from this figure, the gain of the EDFA part is improved in the wavelength region of 1490 nm to 1520 nm if the wavelength of the pumping light is not more than 976 nm.

Figure 14:
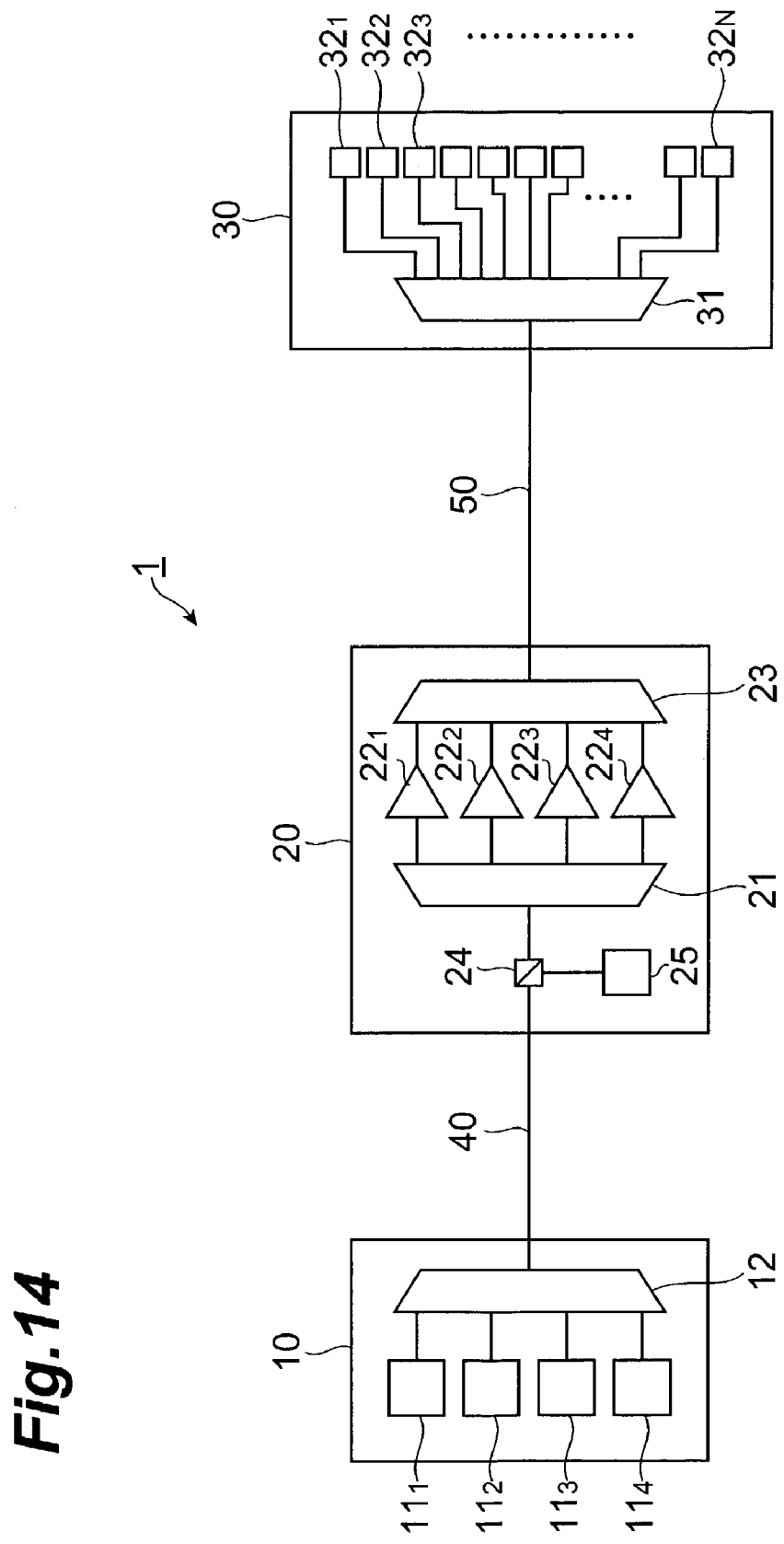
FIG. 14 is a view showing the structure of the optical communication system according to the present invention.

The following will describe an optical communication system according to the present invention. FIG. 14 is a view showing the structure of the optical communication system 1 according to the present invention. The optical communication system 1 shown in this figure comprises an optical transmitter 10, an optical repeater 20, and an optical receiver 30, an optical fiber transmission line 40 is installed between the optical transmitter 10 and the optical repeater 20, and an optical fiber transmission line 50 is installed between the optical repeater 20 and the optical receiver 30.

The optical transmitter 10 has light source portions $11_1$ to $11_4$ and an optical multiplexer 12. The light source portion $11_1$ outputs multiplexed signal light of a plurality of channels included in the wavelength band of 1455 nm to 1490 nm (hereinafter referred to as "Sb band") The light source portion $11_2$ outputs multiplexed signal light of a plurality of channels included in the wavelength band of 1490 nm to 1520 nm (hereinafter referred to as "Sr band") The light source portion $11_3$ outputs multiplexed signal light of a plurality of channels included in the C-band. The light source portion $11_4$ outputs multiplexed signal light of a plurality of channels included in the L-band. The optical multiplexer 12 further multiplexes the signal light of the plurality of channels outputted from the respective light source portions $11_1$ to $11_4$ and feeds the multiplexed signal light into the optical fiber transmission line 40. The optical multiplexer 12 may be configured first to multiplex the components of the Sb band and the Sr band and multiplex the components of the C-band and the L-band and thereafter to multiplex the components of all the bands.

The optical repeater 20 has an optical demultiplexer 21, optical amplifiers $22_1$ to $22_4$, an optical multiplexer 23, an optical coupler 24, and a pumping light source 25. The optical coupler 24 delivers Raman amplification pumping light outputted from the pumping light source 25, into the optical fiber transmission line 40 and also outputs the multiplexed signal light arriving through the optical fiber transmission line 40, to the optical demultiplexer 21. The optical demultiplexer 21 receives the input of the multiplexed signal light and demultiplexes the signal light into components of the respective bands. The optical demultiplexer 21 outputs the Sb-band signal light to the optical amplifier $22_1$, the Sr-band signal light to the optical amplifier $22_2$, the C-band signal light to the optical amplifier $22_3$, and the L-band signal light to the optical amplifier $22_4$. The optical demultiplexer 21 may be configured first to demultiplex the signal light into components of the Sb-band and the Sr-band and components of the C-band and the L-band and thereafter to demultiplex the components into those of the respective bands.

The optical amplifier $22_1$ receives the input of the Sb-band signal light from the optical demultiplexer 21, amplifies the signal light in a lump, and outputs the amplified signal light. The optical amplifier $22_2$ receives the input of the Sr-band signal light from the optical demultiplexer 21, amplifies the signal light in a lump, and outputs the amplified signal light. The optical amplifier $22_3$ receives the input of the C-band signal light from the optical demultiplexer 21, amplifies the signal light in a lump, and outputs the amplified light. The optical amplifier $22_4$ receives the input of the L-band signal light from the optical demultiplexer 21, amplifies the signal light in a lump, and outputs the amplified signal light. The optical multiplexer 23 multiplexes the signal light of the plurality of channels outputted from the respective optical amplifiers $22_1$ to $22_4$ and delivers the multiplexed signal light into the optical fiber transmission line 50.

The optical receiver 30 has an optical demultiplexer 31 and light receiving portions $31_1$ to $32_N$. The optical demultiplexer 31 demultiplexes the multiplexed signal light arriving through the optical fiber transmission line 50, into respective wavelength components and outputs the signal light. The light receiving portion $31_n$ accepts input of the signal light of the wavelength $\lambda_n$ outputted from the optical demultiplexer 31 to receive the signal light. However, N represents an integer not less than 4, and n an arbitrary integer not less than 1 nor more than N.

Figure 15A:
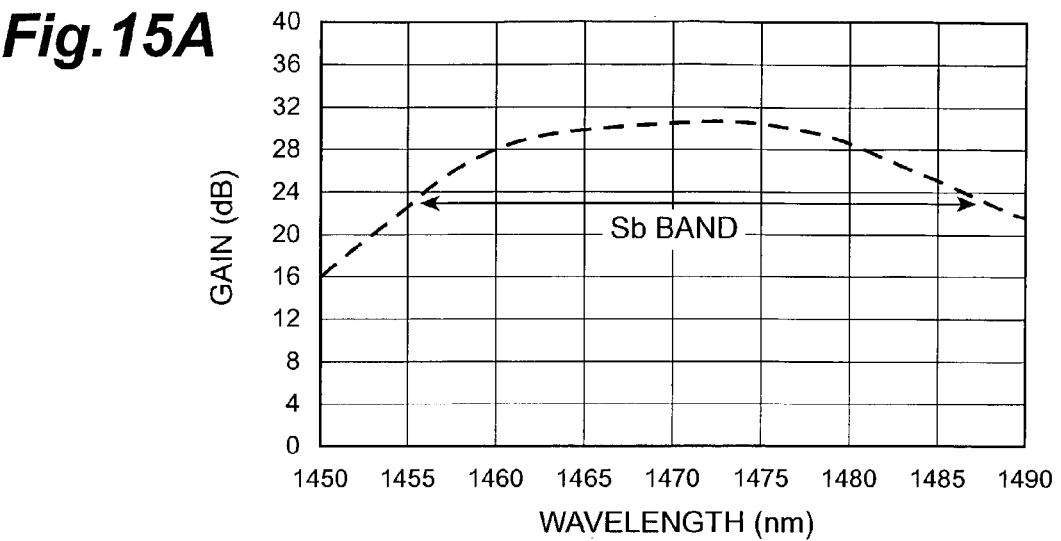
FIGS. 15A to 15C are graphs showing the gain characteristics of the respective optical amplifiers included in the optical communication system of FIG. 11, respectively.
Figure 15B:
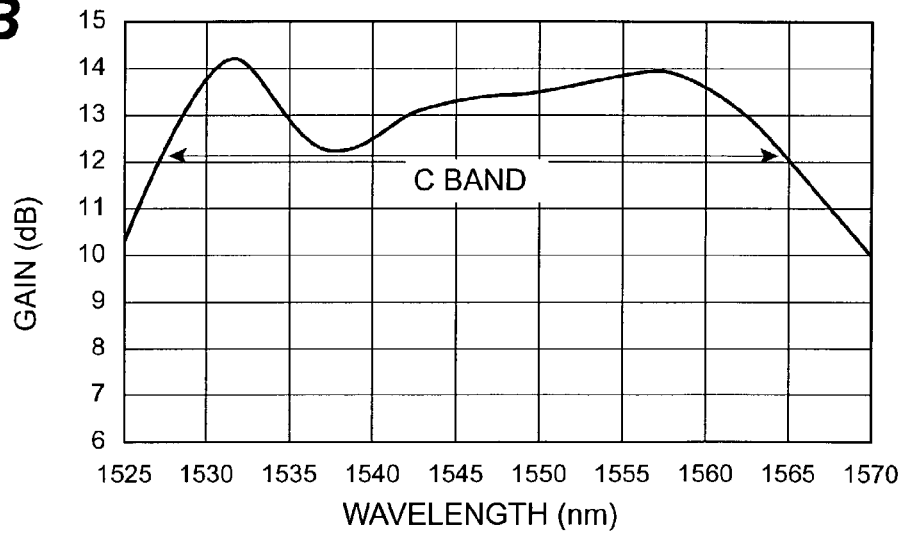
Figure 15C:
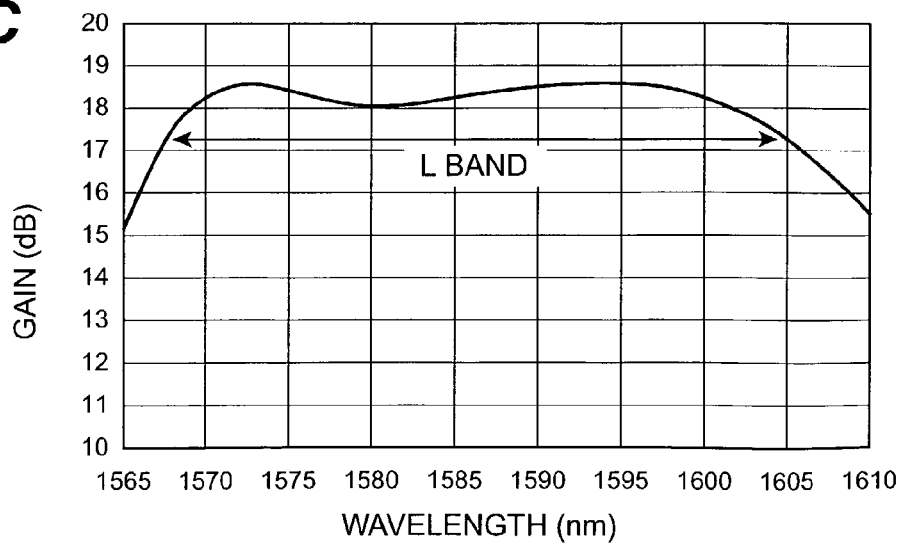

Among the four optical amplifiers included in the optical repeater 20, the optical amplifier $22_1$ for amplifying the Sb-band signal light is a TDFA pumped in the 1.05 μm wavelength band. The optical amplifier $22_2$ for amplifying the Sr-band signal light is one having the structure similar to that of the optical amplifier 100 according to the above-mentioned embodiment. The optical amplifier $22_3$ for amplifying the C-band signal light is a normal C-band EDFA. The optical amplifier $22_4$ for amplifying the L-band signal light is an L-band EDFA. FIG. 15A is a graph showing the gain characteristics of the Sb-band optical amplifier $22_1$. FIG. 15B is a graph showing the gain characteristics of the C-band optical amplifier $22_3$. FIG. 16C is a graph showing the gain characteristics of the L-band optical amplifier $22_4$.

The following will describe a more specific configuration of the optical communication system 1 according to the present invention. In this configuration, the Sb-band multiplexed signal light includes thirty nine channels with the frequency interval of 100 GHz included in the wavelength band of 1456.7 nm to 1486.3 nm. The Sr-band multiplexed signal light includes forty two channels with the frequency interval of 100 GHz included in the wavelength band of 1490.8 nm to 1522.6 nm. The C-band multiplexed signal light includes forty five channels with the frequency interval of 100 GHz included in the wavelength band of 1528.0 nm to 1563.9 nm. The L-band multiplexed signal light includes forty one channels with the frequency interval of 100 GHz included in the wavelength band of 1568.8 nm to 1603.2 nm. The optical communication system 1 constructed in this configuration can transmit the multiplexed signal light in the wavelength band of 1.45 µm to 1.61 µm with good transmission characteristics while the unused wavelength region is not more than 15 nm.

In the above example, the signal wavelength band includes a plurality of bands spaced by the unused wavelength region having the bandwidth of 4 nm to 6 nm. This is reasonable in view of the fluorescence properties of the respective elements Er and Tm. It is also reasonable in consideration of the current technology level where each optical multiplexer and each optical demultiplexer are comprised of dielectric multilayer filters.

Figure 16:
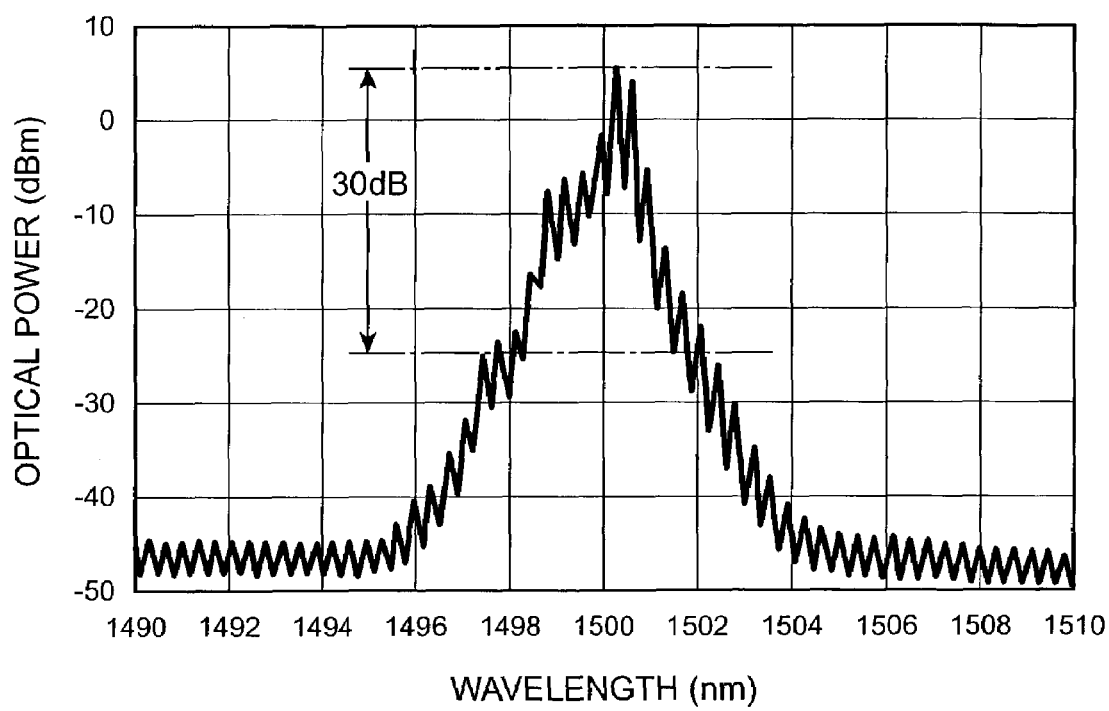
FIG. 16 is a spectrum of output light from a semiconductor laser light source with a fiber grating.

In view of the Raman amplification of the signal light in the optical fiber transmission line, it is preferable to set the channels of the Raman amplification pumping light in the unused wavelength region between the Sb band and the Sr band, in the unused wavelength region between the Sr band and the C-band, or in the unused wavelength region between the C-band and the L-band. In this case, in order to avoid the negative effect on the signal light from the Rayleigh scattering of the Raman amplification pumping light, it is desirable that the 30 dB-down bandwidth of this pumping light be narrower than the unused wavelength bandwidth. The Raman amplification pumping light sources often used at present are semiconductor laser light sources with a fiber grating and have the output light spectrum as shown in FIG. 16, the 30 dB-down bandwidth of which is about 4 nm to 5 nm. From this respect, the unused wavelength bandwidth of 4 nm to 6 nm is appropriate.

The present invention is not limited to the above embodiments, but can embrace various changes and modifications. For example, the optical amplification module according to the present embodiment was one including the EDF as the Er-doped optical waveguide having the optical waveguide region doped with Er and including the TDF as the Tm-doped optical waveguide having the optical waveguide region doped with Tm. However, the optical amplification module according to the present invention may be one in which optical waveguides formed on a flat substrate are doped with Er or Tm. However, the optical amplification module using the optical fibers doped with the rare earth elements like EDF and TDF is preferable in that the waveguide length can be readily increased to enhance the gain.

The optical amplification module according to the present invention is one capable of amplifying the input signal light by supplying the pumping light of the predetermined wavelength and outputting the amplified signal light. However, if this optical amplifier module receives no input signal light except for the supply of the pumping light of the wavelengths capable of pumping Er and Tm, it will output spontaneous emissions generated in the respective Tm-doped optical waveguide and Er-doped optical waveguide. In this case, this optical amplification module and the pumping light supply means constitute a white light source which outputs the white light in the wavelength region of 1.45 µm to 1.61 µm. This white light source has the structure almost similar to that shown in FIG. 1, except that the optical branching devices 121, 122 and the signal light detecting sections 181, 182 are unnecessary, because there is neither input nor output of the signal light.

As detailed above, according to the present invention, the pumping light of the wavelength capable of pumping Er ions is supplied from the first pumping light supply means into the Er-doped optical waveguide, and the pumping light of the wavelength capable of pumping Tm ions is supplied from the second pumping light supply means into the Tm-doped optical waveguide. In the optical amplification module including the Er-doped optical waveguide and the Tm-doped optical waveguide, the signal light is amplified in both the Er-doped optical waveguide and the Tm-doped optical waveguide. Accordingly, the total gain spectrum is the sum of the gain spectra of the respective Er-doped optical waveguide and Tm-doped optical waveguide. For this reason, the gain of amplification of the signal light becomes flatter near the wavelength band of 1490 nm to 1520 nm than before.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplification module having an amplification band within a range of 1490 nm to 1520 nm, comprising:
   an Er-doped optical waveguide having an optical waveguide region doped with Er;
   a pumping light source optically connected to one end of said Er-doped optical waveguide through an optical coupler, whereby pumping light generated in said pumping light source is supplied into said Er-doped optical waveguide;
   a temperature adjustor including a section which is arranged adjacent to said Er-doped optical waveguide, said temperature adjustor adjusting a temperature of said Er-doped optical waveguide and maintaining the temperature of said Er-doped optical waveguide at a predetermined temperature higher than room temperature, on the basis of the result of the detection; and
   a cutoff filter provided on an optical path between an input end and an output end of said optical amplification module, said cutoff filter cutting off light in a wavelength band of 1530 nm or more so as to remove amplified spontaneous emission light in C-band.

2. An optical amplification module according to claim 1, wherein said temperature adjustor maintains the temperature of said Er-doped optical waveguide at 65° C. or more.

3. An optical amplification method, comprising the steps of:
   preparing an optical amplification module that comprises; an Er-doped optical waveguide having an optical waveguide region doped with Er; a pumping light source supplying pumping light into said Er-doped optical fiber; and a temperature adjustor performing a temperature control for said Er-doped optical fiber separate from a temperature control for said pumping light source;

controlling said temperature adjustor so as to maintain temperature of said Er-doped optical waveguide at a predetermined temperature higher than room temperature;

amplifying light within a wavelength range of 1490 nm to 1520 nm; and sending the amplified signal through a cutoff filter cutting off light in a wavelength band of 1530 nm or more.

4. An optical amplification method according to claim 3, wherein said temperature adjustor reduces a gain deviation of said Er-doped optical fiber in the wavelength range by adjusting the temperature of said Er-doped optical fiber at the predetermined temperature higher than room temperature.

5. An optical amplification method according to claim 3, wherein said temperature adjustor reduces a relative gain deviation of said Er-doped optical fiber in the wavelength range by adjusting the temperature of said Er-doped optical fiber at the predetermined temperature higher than room temperature.

6. An optical amplification method according to claim 3, wherein said temperature adjustor increases a gain of said Er-doped optical fiber in the wavelength range by adjusting the temperature of said Er-doped optical fiber at the predetermined temperature higher than room temperature.

7. An optical amplification module according to claim 1, wherein said cutoff filter equalizes a gain of light in the range of 1490 to 1520 nm.

8. An optical amplification method according to claim 3, wherein said cutoff filter equalizes a gain of light in the range of 1490 to 1520 nm.

* * * * *